July 30, 1935.  H. S. PARDEE  2,009,515
VALVE SYSTEM
Filed Sept. 16, 1933  3 Sheets-Sheet 1
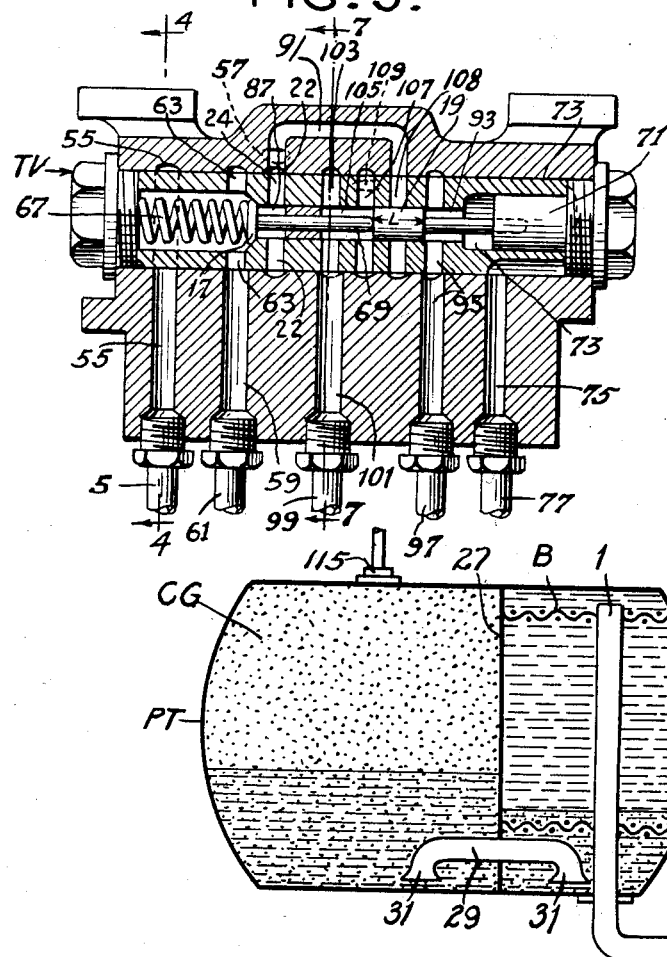
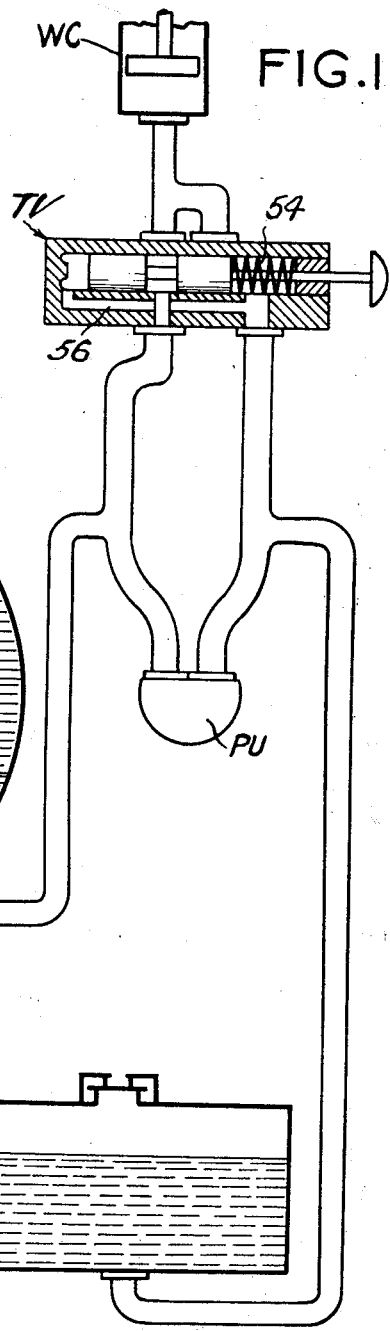
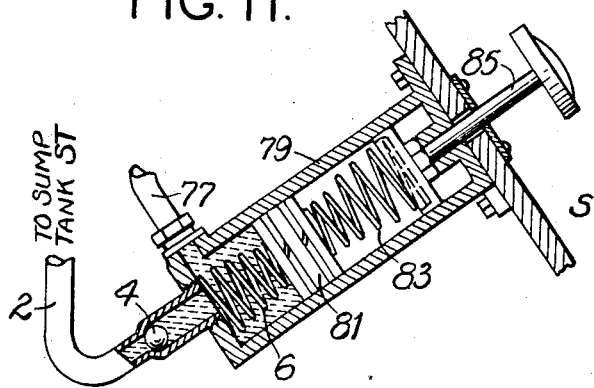

July 30, 1935. H. S. PARDEE 2,009,515
VALVE SYSTEM
Filed Sept. 16, 1933 3 Sheets-Sheet 2
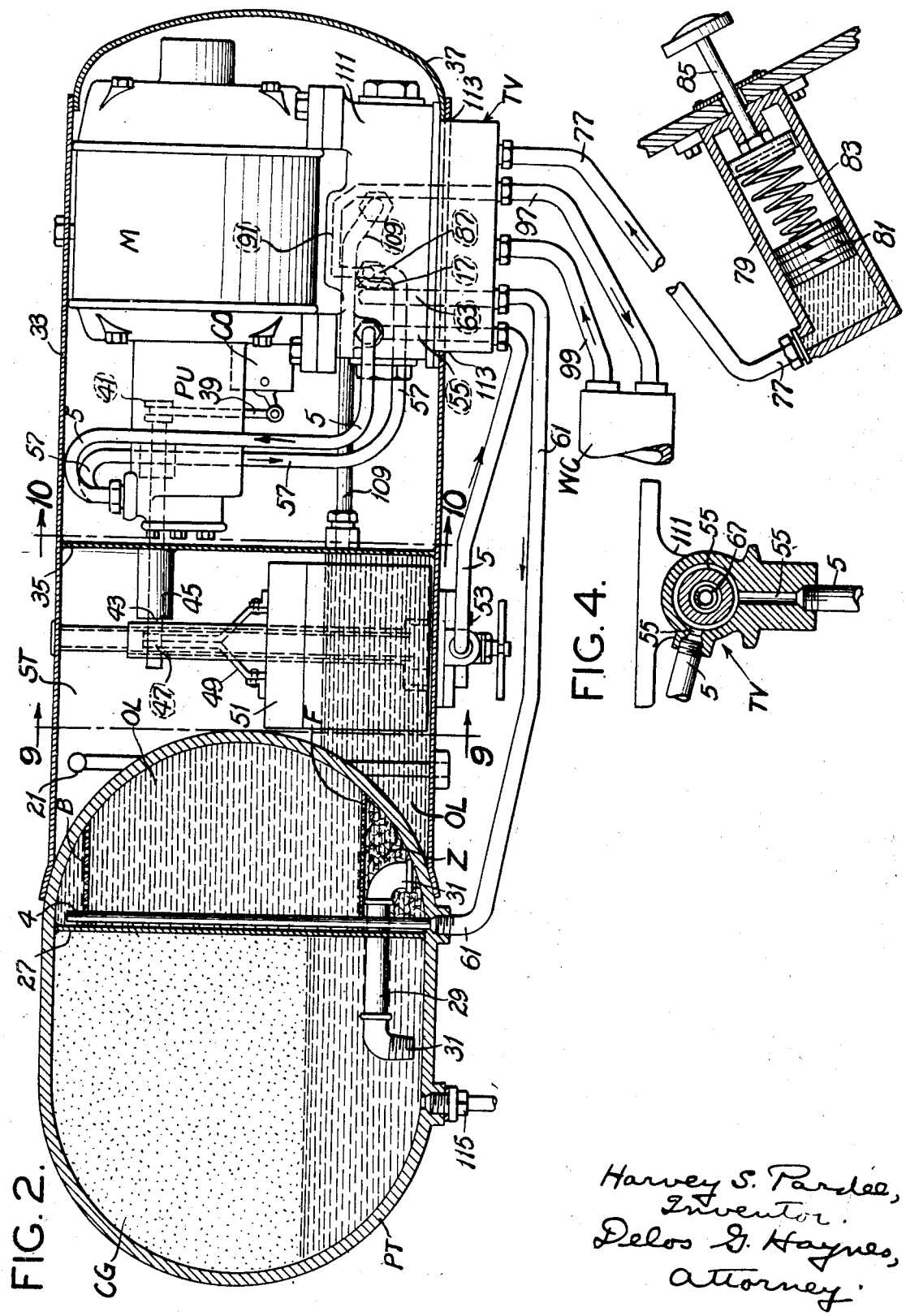

July 30, 1935.  H. S. PARDEE  2,009,515
VALVE SYSTEM
Filed Sept. 16, 1933   3 Sheets-Sheet 3

Harvey S. Pardee,
Inventor.
Delos G. Haynes,
Attorney.

Patented July 30, 1935

2,009,515

UNITED STATES PATENT OFFICE 2,009,515

VALVE SYSTEM

Harvey S. Pardee, Ravinia, Ill., assignor, by mesne assignments, to Hydromatic Corporation, Chicago, Ill., a corporation of Illinois Application September 16, 1933, Serial No. 689,719

5 Claims. (Cl. 60—52)

This invention relates to valve systems, and with regard to certain more specific features to hydro-pneumatic valve systems.

This invention is a division, in part, of my co-pending application Serial Number 637,910, filed October 15, 1932, Patent No. 1,927,752, for Hydropneumatic power system, and a continuation in part thereof.

Among the several objects of the invention may be noted the provision of a power system utilizing a liquid or liquids under compression as a force-transmitting medium between a point of energy storage and work to be accomplished, the energy storage being effected in a compressed gas, and wherein an improved, self-lapping control valve is used; and the provision of a valve of this class having associated therewith a recharging means to insure continuous, perfect operation. Other objects will be in part obvious and in part pointed out hereinafter.

The invention accordingly comprises the elements and combinations of elements, features of construction, and arrangements of parts which will be exemplified in the structures hereinafter described, and the scope of the application of which will be indicated in the following claims.

In the accompanying drawings, in which is illustrated one of several various possible embodiments of the invention, Fig. 1 is a diagrammatic view illustrating the general type of system to which the invention is applied;

Fig. 2 is a longitudinal section taken through a practical assembly embodying the circuit of Fig. 1 and also a control pedal;

Fig. 3 is a longitudinal section of a valve, a side elevation of which is shown in Fig. 2;

Fig. 4 is a cross section taken on line 4—4 of Fig. 3;

Fig. 11 illustrates a charging device for a pedal control.

Similar reference characters indicate corresponding parts throughout the several views of the drawings.

Figure 5:
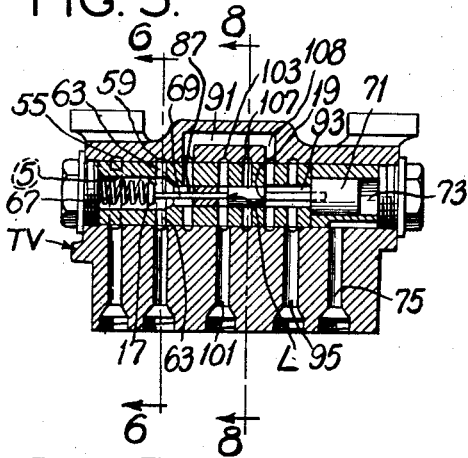
Fig. 5 is a view similar to Fig. 3 showing an alternative position of parts.
Figure 6:
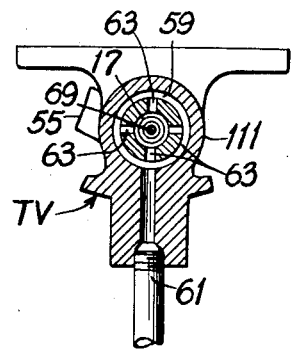
Fig. 6 is a cross section taken on line 6—6 of Fig. 5.
Figure 7:
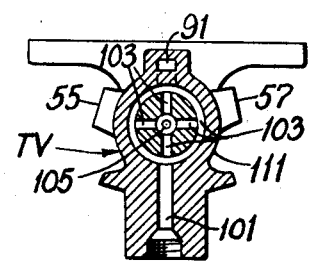
Fig. 7 is a cross section taken on line 7—7 of Fig. 3.
Figure 8:
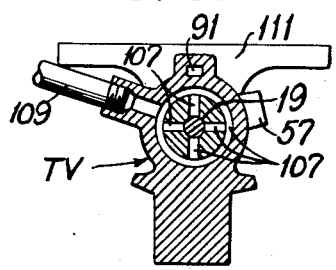
Fig. 8 is a cross section taken on line 8—8 of Fig. 5.
Figure 9:
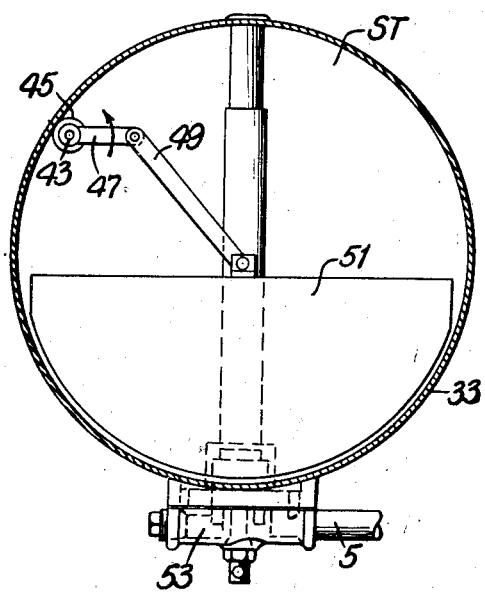
Fig. 9 is a cross section taken on line 9—9 of Fig. 2.
Figure 10:
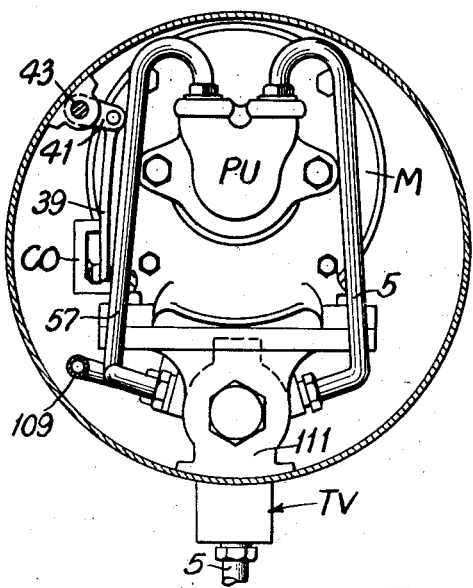
Fig. 10 is a cross section taken on line 10—10 of Fig. 2.

The needs for and advantages of the system in general are described in my Patent 1,927,752 above referred to. These will not be repeated herein. However, the description of the system in general will be shortly outlined for greater clarity.

Referring now more particularly to Fig. 1, index PU represents a pump, driven by a motor. The pump PU pumps from a sump tank ST into a pressure tank PT, as described in said application. The pressure tank is a source of fluid under pressure.

WC represents a work cylinder, as for instance, the brake cylinder on a vehicle. TV is a three-way valve diagrammatically represented in Fig. 1, by means of which the work cylinder can be connected at will to the source of pressure in tank PT, or to the sump tank ST from which the pump PU draws its supply. The pump delivers to the work cylinder by way of said valve TV and/or to the pressure tank PT. The tank PT contains liquid and compressed gas CG, which serves to store potential energy. The gas (for instance air) is initially introduced under pressure through a suitable check valve 115 or the like.

As explained in said application, tank PT is divided into two compartments, the two being separated by means of a wall 27, and being in communication at their lower portions by means of a crosspipe 29.

The outlet 1 is placed at the upper end of the chamber in which unsaturated oil is located, and a baffle B is placed near the outlet. The oil in contact with the air in the tank PT becomes saturated in part, the saturated portion sinking to the region of the fluid at the cross pipe 29, and thus normally saturated fluid is prevented from reaching the outlet 1. The charge of the pump PU is so related to the volume of fluid contained in the tank PT that air never gets into the pipe 29, nor does the level of saturated fluid ever rise to pass into the pipe 1.

The present invention is shown per se in Figs. 2 to 10. Referring to Fig. 2 it will be seen that the pressure tank PT is made of an ovate form having a partition 27 and outlet pipe 4 therein. To this tank PT is welded a cylinder 33 which with the aid of a hermetically sealed wall 35 forms the sump tank ST. A head 37 encloses the structure. Prior to closing, the parts shown in Fig. 2 are placed within the cylinder 33. Thus a fool-proof compact structure is effected. The motor M, pump PU, switch CO and auxiliary parts to be described are interiorly located as shown.

In Fig. 2 I have shown the motor and pump PU cut out by action of a float. This is done by linking the switch CO by means of a link 39 with a lever 41 on a shaft 43. The shaft 43 passes through a bushing 45 into the sump tank ST where it is operated by a lever 47 and a connecting rod 49 reaching to a float 51. Thus when the level in the sump tank is subnormal, the motor M is cut out, this being an indication that enough liquid has been withdrawn and delivered to the pressure tank to effect the rise of pressure for which the system is designed.

Further describing Figs. 2 to 10, it will be seen that liquid is withdrawn from tank ST by way of line 5, the same passing through a suitable strainer 53 and being drawn through a constantly open auxiliary port 55 (see Fig. 4) forming an auxiliary to said three-way valve TV. From this point the liquid is drawn over the continuation of line 5 through the pump PU and then driven over a line 57, to a constantly open passage 87 by way of passages 22 and 24 (Fig. 3) forcing open the poppet valve 17 and to the pressure tank by way of ports 63, 59 and line 61. Valve 17 thus acts as a check valve preventing back flow through the pump slippage when the pump is not running. It also acts as a seal preventing the slight flow from the tank PT through the slight slip of the piston valve 19 when the latter is in position to close port 108.

In order to operate the valve 17 which is normally held shut by a biasing spring 67, I provide the valve with a stem 69 engageable by the second valve element 19. The element 19 is fastened to an operating plug or reaction piston 71, the latter working in a cylinder 73 which, by means of a communicating passage 75 and a pipe 77 communicates with a master cylinder 79 having a piston 81 therein operable through a spring or other resilient means 83 by a foot pedal control 85. It is to be understood that the hydraulic connection shown between the spring 83 and the plug 71 may be replaced by a mechanical one.

When the pedal 85 is depressed, the liquid in the pipe 77 and passage 75 is pressed so as to move the plug 71 to the left (Fig. 5). Otherwise, the plug is moved to the right by action of the spring 67 (Fig. 3). If the plug is at the right, as is shown in Fig. 3 (foot off the pedal 85), then the valve 17 is shut. Whether or not the motor M will operate, depends upon conditions of the float in the sump tank ST.

When it is desired to operate the brake, the pedal 85 is depressed, whereupon the plug 71 is forced to the left, thus opening the valve 17 and permitting pressure to flow from the passage 59 (which communicates with the pressure tank PT) by way of the passage 87 and the by-pass 91, passage 95 and to the pipe 97 passing to the work cylinder. When the foot is released, the ultimate position is shown at Fig. 3, wherein the work cylinder may drain by way of pipe 99 through passage 101, passages 103 (Fig. 7), passage 105, passages 107 (Fig. 8) and thus to the sump tank ST by way of line 109.

I have found that the best brake operation is effected by systems wherein the reaction to leg or hand pressure increases with the braking effect produced by movement of the control lever or pedal, that is, the operator can best judge of the manner in which the vehicle is being decelerated or other effects accomplished by having his control increase its reaction as the braking effect is increased, as in the case of the ordinary automobile brake. In order to simulate these conditions in the present system, the pressure in the brake line reacts on the plug 71 and thence to the pedal. The length L of the valve closure 19 is made slightly longer than the distance between corresponding cut-off edges of ports 107 and 108. Thus an amount of lap is introduced so that both exhaust and feed ports are cut off when the valve is balanced at any desired brake pressure corresponding to the pressure exerted in depressing the pedal.

To effect said reaction on the operator's limb, the passage 93 is made to communicate with the cylinder 73 which holds the plug 71. Thus the left-hand side of the plug 71 is subjected to the working pressure leading to the brake cylinder.

In view of the above, when the pedal 85 is depressed, the spring 83 is first compressed, thus putting pressure on the fluid in the separate hydraulic transmission system controlled thereby. This system causes the movement of the plug 71.

As soon as the plug 71 moves, the valve 17 opens, thus permitting pressure to flow against the side of the plug 19, the plug 71 finally moving to a position where the exhaust port 107 is closed just ahead of the time at which the port 108 opens.

When the port 108 opens, pressure flows to the work cylinders by way of the passages 93 and 95 and pipe 97, and at the same time delivers the same unit pressure against the plug 71 so that it is forced back so as to react against the fluid in the cylinder 79 and the spring 83 therein. This effects a proportional reaction on the operator's foot.

At the same time the spring 67, in expanding, sets the valve 19 back into a position where it cuts off the flow from the by-passage 91. The valve 19 being slightly longer than the distance between corresponding edges of exhaust port 107 and supply port 108, results in pressure being cut off without effecting exhaust port opening, so that under these conditions the work cylinder is not exhausted, nor is more pressure introduced; and the plug 71 remains in equilibrium, as well as the piston 81 and the foot pedal 85, that is, as long as the operator's foot remains physically constantly tensioned against the pedal.

If the operator wishes to place more pressure in the work cylinder, he further depresses the pedal 85 and the said functions are repeated, the valve 19 first moving to the left to slightly uncover the port 108 so as to introduce more pressure into the work cylinder, thereupon also introducing more pressure against the plug 71 and setting up a greater reaction thereon. The plug 71 then returns, as does the portion of the valve 19 so that equilibrium is again set up under new pressure conditions at the pedal 85.

When pressure is taken off the pedal 85, the pressure on the plug 71 sends it to the right, thus cutting off the pressure supply at passage 108 to the work cylinder, and opening the exhaust passage 107.

It will be understood that some slip may occur past the piston 81 and thus after a time the piston 81 will strike the bottom of the cylinder 79 before the proper pressure can be built up in the spring 83 for proper brake application. In order to avoid this, the feature of Fig. 11 is used wherein a pipe 2 is led from the sump tank ST and connected to the cylinder 79 by way of a check valve 4 opening inwardly to the cylinder 79 below the piston 81. A return spring 6 for the piston 81 functions to force the piston 81 upwardly after pressure has been reduced on pedal 85 and thus to draw in a charge through the check valve 4 in proportion to the amount of fluid that has leaked past the piston 81 on a given stroke thereof. By this means the pedal 81 is maintained in standard initial operating condition.

It will be noted that the valve TV shown in Fig. 1 is illustrative of such portions of the valve TV shown in Fig. 2 as is needed to describe said diagrammatic Fig. 1. The tension spring 54 is illustrative of the automatic foot reaction means above described. The cross connection 56 illustratively provides the balanced condition for the valve.

In view of the above, it will be seen that the several objects of the invention are achieved and other advantageous results attained.

As many changes could be made in carrying out the above constructions without departing from the scope of the invention, it is intended that all matter contained in the above description or shown in the accompanying drawings shall be interpreted as illustrative and not in a limiting sense.

I claim:

1. A valve system comprising a source of fluid under pressure, a pump, work means, a pressure connection between said source of pressure and the work means and the pump, release means comprising a release passage from the work means, a valve interposed in the pressure and release connections to the work means, said valve being self-lapping, resilient means for operating said valve, and a check valve connected with said self-lapping valve and partaking of its motion in one direction only, said check valve being located in said pressure connection, its motion in said one direction effecting connection between the source of fluid under pressure and the pump.

2. A valve system comprising a body having an inlet under pressure and an outlet to a pressure tank, a check valve between said inlet and outlet checking against return flow from the outlet, means normally biasing said check valve to closed position, a second outlet to work means communicating with said inlet, and with said pressure tank when the check valve is open, and said valve having an exhaust, movable cut-off means for said work outlet and the exhaust or either, control means controlling said cut-off means and subject to pressure in the work outlet, said control means and said cut-off means being adapted to partake of the movement of said check valve when it is biased to closed position.

3. A valve system comprising a body having an inlet under pressure and an outlet to a pressure tank, a check valve between said inlet and outlet checking against return flow from the outlet, means normally biasing said check valve to closed position, a second outlet to work means communicating with said inlet, and with said pressure tank when the check valve is open, and said valve having an exhaust, movable cut-off means for said work outlet and the exhaust or either, resiliently operable control means controlling said movable means and subject to pressure in said work outlet, said control means and said cut-off means being adapted to partake of the movement of said check valve when it is biased to closed position, said check valves being operable to a non-biased position without moving the control means.

4. A valve having a body, an inlet adapted to be placed under pressure, an outlet under pressure, a poppet valve in said body between said inlet and outlet, a spring biasing said valve to a seat, said body having a second outlet to a work means and an exhaust port from said work means, a plug adapted to cover both said outlet and exhaust to and from the work means or either of them, resiliently operable means controlling said plug but subject to pressure from the work means, said resiliently operable means and said plug and said poppet valve being aligned for contact, whereby motion of the plug to admit pressure to the work means and cut off the exhaust from the work means determines opening of the poppet valve against its biasing means to admit pressure from the pressure inlet and the pressure tank, but the resiliently operable means and the plug being separately movable away from the valve when open to effect exhaust of the work means and cutting off of the pressure thereto without effecting closure of said poppet valve between the pressure inlet and the pressure tank.

5. A valve system comprising a body having a pressure inlet, an outlet connected with a pressure tank, a valve when open communicating said inlet and outlet, means normally biasing the valve to closed position, said body having a second outlet to a work means and an exhaust from said work means, self-lapping movable means controlling pressure to and from said work means by way of said outlet and exhaust respectively, and a lost-motion connection between said self-lapping means and the biasing valve whereby the valve is lifted when said self-lapping means moves to effect communication of pressure to the work means, the valve being adapted to remain open when required under pressure from said inlet to the pressure tank outlet when said self-lapping means cuts off said pressure to the work means and communicates the work means with said exhaust.

HARVEY S. PARDEE.